United States Patent [19]

Davis et al.

[11] Patent Number: 5,385,628
[45] Date of Patent: Jan. 31, 1995

[54] GASKET WELDING APPARATUS AND METHOD

[76] Inventors: Roland Davis, P.O. Box 5303, Winter Park, Fla. 32793-5303; Gil Koch, 3945 S. Peninsula Dr., Daytona Beach, Fla. 32127

[21] Appl. No.: 35,434

[22] Filed: Mar. 24, 1993

[51] Int. Cl.6 ..................... B29C 65/20; B29C 65/34
[52] U.S. Cl. .................... 156/499; 156/304.2; 156/304.6; 156/507
[58] Field of Search .......... 156/507, 544, 499, 304.2, 156/304.6, 157, 158, 556; 269/104, 107, 162, 41, 42

[56] References Cited

U.S. PATENT DOCUMENTS

| | | |
|---|---|---|
| 3,111,728 | 11/1963 | Alderfer . |
| 3,126,590 | 3/1964 | Monti . |
| 3,186,891 | 6/1965 | Gelling ................. 156/507 |
| 3,562,957 | 2/1971 | Landis . |
| 4,441,278 | 4/1984 | Covey, III . |
| 4,644,698 | 2/1987 | Gerdes et al. . |
| 4,700,509 | 10/1987 | Merla . |
| 4,860,495 | 8/1989 | Kessler . |
| 4,995,935 | 2/1991 | Ganzberger ........... 156/507 |
| 5,246,534 | 9/1993 | Tanner ............... 156/304.2 |

FOREIGN PATENT DOCUMENTS

| | | | |
|---|---|---|---|
| 1910308 | 9/1970 | Germany ............. 156/304.6 |
| 1910309 | 9/1970 | Germany ............. 156/304.6 |
| 0063277 | 5/1977 | Japan ................. 156/304.6 |
| 0088220 | 3/1990 | Japan ................. 156/304.6 |
| 0842782 | 7/1960 | United Kingdom ..... 156/304.6 |

*Primary Examiner*—Michael W. Ball
*Assistant Examiner*—Daniel J. Stemmer
*Attorney, Agent, or Firm*—Warren L. Franz; James H. Beusse

[57] ABSTRACT

Bevelled end edges (37, 38) of gasket lengths (21, 36) are fused into miter joints (39) at corners (18) by welding apparatus having jig and clamp sets (64) on plates (49, 50) that are mounted on rails (59, 60) and separated by cam followers (81, 82) which interact against the bias of a spring (87) with a cam (88) which is rotated by a handler (93) on a shaft (73) to set the spacing of the sets (64). End edges (37, 38) are aligned in the spacing gap (54) against surfaces (185, 186) of a sissy bar (180) which is lifted up when the cam (88) is turned to its position of longest spacing. The bar (180) is then lowered and a heater block (29) is moved and locked into an advanced position within the gap (54) pulling a handle (115 of a rod (116), by spring finger (122) which shifts onto a lockwheel (125). The cam (88) is turned to an intermediate spacing position to melt the edges (37, 38) against the block (79), and then moved to a shortest spacing position to fuse the melted edges together. In moving from the intermediate to the shortest spacing position, the cam passes through the longest spacing position again, momentarily separating the edges (37, 38) from the block (79) and aligning the finger (122) with a lockwheel cutout (127), to return the block (79) to its retracted position under the bias of a spring (118).

9 Claims, 6 Drawing Sheets

GASKET WELDING APPARATUS AND METHOD

This invention relates to closure sealing gaskets, in general; and, in particular, to a novel apparatus and method for welding together the ends of heat fusible gasket members.

BACKGROUND OF THE INVENTION

The use of ribbon-like strips of flexible resilient elastomeric or similar deformable material to seal the closure gaps between refrigerator doors and cabinets, or the like, is well-known. The strips are applied marginally, either directly or with the aid of a track, on one or both of the facing surfaces of the door perimeter or abutting shoulder of the cabinet frame. The gasket profile is filled out with a magnetic strip or elastically compressible sponge or other filler to ensure that the gap between the shoulder and frame is filled.

Door gaskets for commercial and home refrigerators come in many different profiles, each model refrigerator typically having its own separate original equipment gasket configuration. To replace a gasket, therefore, it has heretofore been necessary for the service technician to either maintain a large gasket inventory, or suffer delay until a matching gasket can be obtained. Some gaskets include a base or tail that has a dart-like projection which is inserted into a slot. Others have a "C-shaped" tail or flange that goes under an edge of a door skin or liner, necessitating the removal of the liner for replacement. The gap between a door and frame is filled by the gasket, sometimes having a magnetic strip attached atop a bellows which expands to fill the gap. Other times, the gap is filled by a compression gasket that has an expanded, compressible contour. Examples of prior art gasket configurations are given in U.S. Pat. Nos. 3,111,728; 3,126,590; 3,562,957; 4,441,278; 4,644,698; 4,700,509; and 4,860,495.

Applicant herein has developed a new closure sealing system, especially suited to refrigerator door closures, that utilizes a universal replacement gasket and track system. Old "C-shaped" gaskets that have a tail embedded under a door skin can be cut off. Other old gaskets can be removed. Both are replaced by a single U-shaped guide channel that can be screwed, stapled or glued to the frame or door, and into which a universal gasket can be fitted. The gasket is of a resilient elastomeric material and includes an upper magnet cavity portion, an intermediate expandable, hollow bellows portion and a base portion. The bellows is attached centrally at the top of the base, and the magnet cavity is attached centrally at the top of the bellows. The base comprises equal, opposite outwardly extending flanges formed to be captured beneath corresponding inwardly-turned upper free edges of the guide channel. The magnet cavity is dimensioned to receive a magnetic strip or compressible sponge insert therein. The bellows can be left empty, or filled with a sponge or other compressible filler. Using Applicant's system, once the track has been installed, the universal gasket will fit as a replacement for all other gaskets. The gasket can be used either with or without the magnetic strip, and with or without one or more sponge fillers, so as to meet all gap requirements.

Whether a traditional gasket strip is employed, or Applicant's new universal replacement gasket and track system is used, there is a need to economically and conveniently join angled ends of gasket strips together at corners. The present invention provides a heat welding apparatus and method suitable to accomplish such purpose.

SUMMARY OF THE INVENTION

It is an object of the present invention to provide a novel apparatus and method for heat welding end edges of lengths of heat fusible gasket material together to form joints; and, especially, for welding bevelled end edges of the same together to form miter joints at corners.

Apparatus is provided having left and right plates with opposing edges spaced laterally across a gap, and mounted on a housing for relative lateral movement along longitudinally-spaced, laterally extending guide rails. Left and right complementary jig and clamp sets, respectively mounted on the plates, include gasket profile matching cavities that define hollow channels for respectively supporting left and right gasket lengths at right angles therein. Cam followers are fixed on the plates to track the surface of a cam which is mounted on a shaft to selectively move the plates through three different settings, corresponding to longest, intermediate and shortest spacings of the gap. A heating element for melting the edges is mounted on the housing for selective longitudinal movement between a retracted position removed from the gap, and an advanced position within the gap. The heating element is biased into its retracted position, and means is provided for releasably locking the element in its advanced position. The locking means is configured to interact with the cam mechanism, so that the heater element will be automatically released and returned to its retracted position, when the plates are moved between their intermediate and shortest spacing positions. A slide assembly associated with each plate provides means for selectively separating each clamp from its associated jig.

In a preferred embodiment, described below, the heater element is mounted on a carriage for axial movement, longitudinally of the cam shaft. A lever arm, pivotally mounted at one end to the housing and at the other to the carriage, is connected to a rod which is pulled to shift the heater element from its retracted to its advanced position. The locking means comprises a spring finger having one end fixed to the carriage and another, hook shaped free end that has a rounded leading edge which passes over the tapered edge of a lockwheel when the carriage advances. The lockwheel includes a cutout and is mounted to rotate with the cam shaft, so that the cutout aligns with the hooked end to release the finger as the cam passes through its longest spacing position, in travel from its intermediate to its shortest spacing positions. A sissy bar, having oppositely facing gasket alignment surfaces, is advantageously mounted on the rear guide rail for pivotal movement between an "up" position wherein the gasket ends can be brought against the alignment surfaces, and an out-of-the-way "down" position.

In practicing the method of the invention, utilizing the apparatus of the invention, the ends of the left and right gasket lengths are abutted with the sissy bar alignment surfaces with the cam positioned to place the plates in their longest spacing positions. After the sissy bar is dropped to its "down" position, the heater rod is pulled to advance the to preheated heater element into its locked position within the gap, out of contact with the gasket length ends. The cam is then moved to its shortest spacing positions, bringing the fusible ends into contact with the heater element hot surfaces for a desired melting time period. The cam is then shifted to its shortest spacing position to bring the molten ends together and fuse them at the joint. In traveling from the intermediate to the shortest spacing positions, the cam passes through its longest spacing position just long enough to momentarily separate the molten ends from the hot surfaces and disengage the locking means to release the heater element back to its retracted position.

BRIEF DESCRIPTION OF THE DRAWINGS

Embodiments of the invention have been chosen for purposes of illustration and description and are shown in the accompanying drawings, wherein.

Throughout the drawings, like elements are referred to by like numerals.

DETAILED DESCRIPTION OF THE PREFERRED EMBODIMENTS

Figure 1:
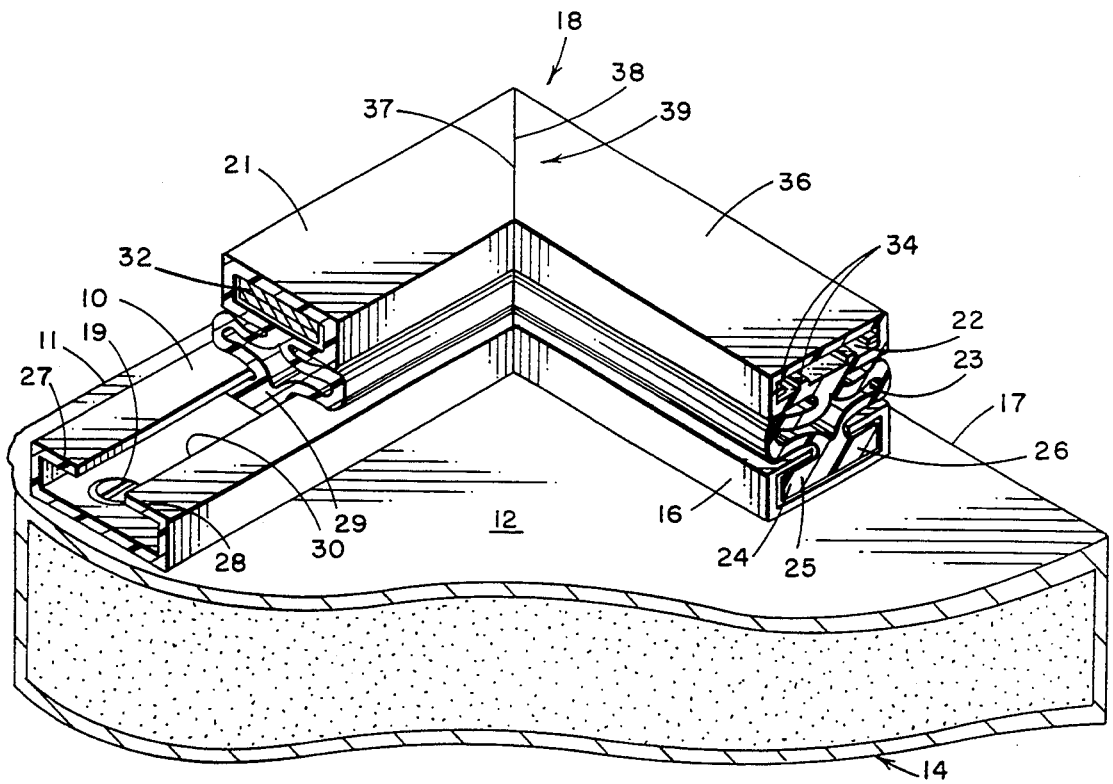
FIG. 1 is an illustrative segment of a closure seal employing Applicant's universal gasket and track system.
Figure 2A:
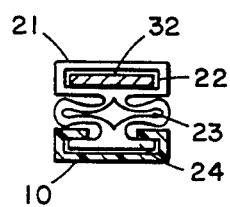
FIGS. 2A–2C show alternative implementations of the gasket profile of FIG. 1.
Figure 2B:
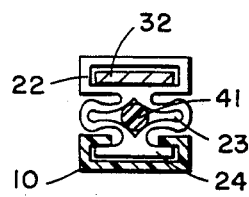
Figure 2C:
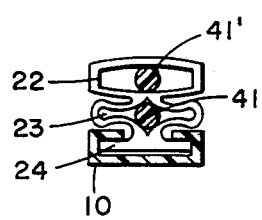

FIGS. 1 and 2A–2C illustrate features of Applicant's new closure sealing system to which the welding method and apparatus of the present invention can be applied. As shown in FIG. 1, a gasket mounting bracket in the form of a first length 10 of U-shaped guide channel track of rigid plastic material is peripherally mounted marginally along a first edge 11 of a cabinet frame shoulder facing surface 12 of an insulated refrigerator door 14. A second length 16 of identical U-shaped guide channel track is peripherally mounted marginally along a second edge 17 of door 14. The first and second track lengths 10, 16 meet at right angles at a corner 18, leaving the ends of their corresponding channels unobstructed. Tracks 10, 16 are attached by fasteners 19 to the door 14.

A first length 21 of heat fusible, extruded flexible gasket is fitted into the channel defined by first track 10. The gasket may be of resilient elastomer material and has a cross-sectional profile characterized by an upper, hollow rectangular cavity portion 22, an intermediate, expandable hollow bellows portion 23, and a generally planar, solid base portion 24. Portions 22, 23, 24 are integrally formed and joined centrally, one above the other, as shown. Base 24 has equal, opposite outwardly directed flanges 25, 26, dimensioned to extend laterally, captured beneath corresponding equal, inwardly-turned upper free edges 27, 28 of channel 10, with central web 29 that joins base and intermediate portions passing through a central opening 30 running longitudinally along the top of the channel. The hollow cavity of portion 22 is dimensioned to receive a length 32 of magnetic strip longitudinally, coaxially therein. Bottom and side ribs 34 extend longitudinally throughout the length of the cavity channel to facilitate insertion of the strip 32.

A second length 36 of identical gasket material is likewise fitted with opposite lateral extensions of its base portion 24 captured within the channel of track 16. Gasket lengths 21, 36 have bevelled end edges 37, 38 cut at 45°, and heat welded together at right angles to form a miter joint 39 at corner 18. Lengths of magnetic strip 32 inserted into respective upper cavities 22 of gasket lengths 21, 36 are cut to match the bevelled edges 37, 38. The tracks 10, 16 can be installed to replace any existing dedicated gasket. The space between door 14 and the adjoining shoulder of the associated cabinet frame can be filled by expanding the upper and intermediate portions 22, 23 of gasket lengths 21, 36 with magnetic strips 32 and/or compressible sponge or other fillers 41, as illustrated by the alternative implementations shown in FIGS. 2A–2C.

Figure 3:
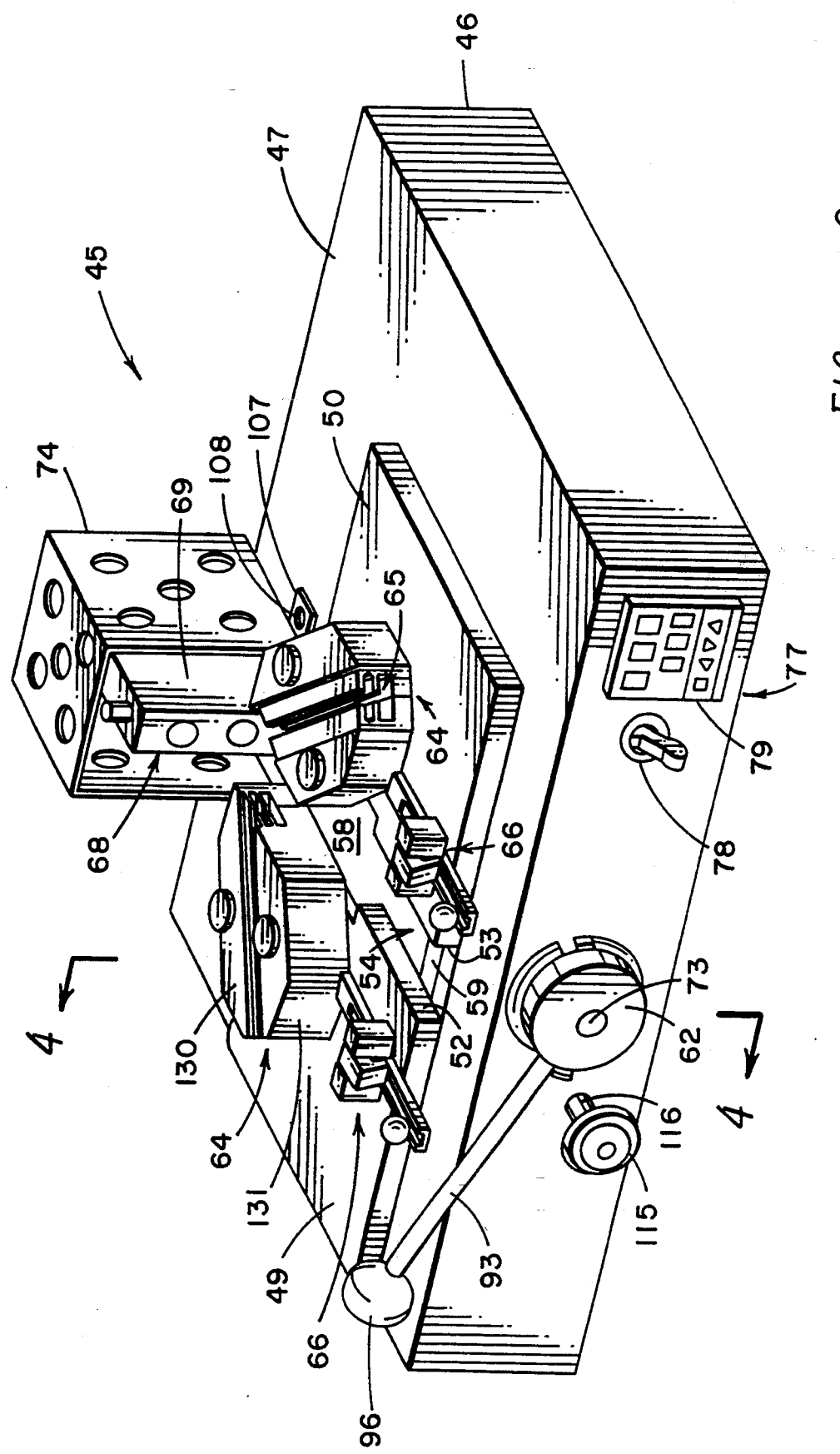
FIG. 3 is a perspective view of gasket welding apparatus in accordance with the invention.
Figure 4:
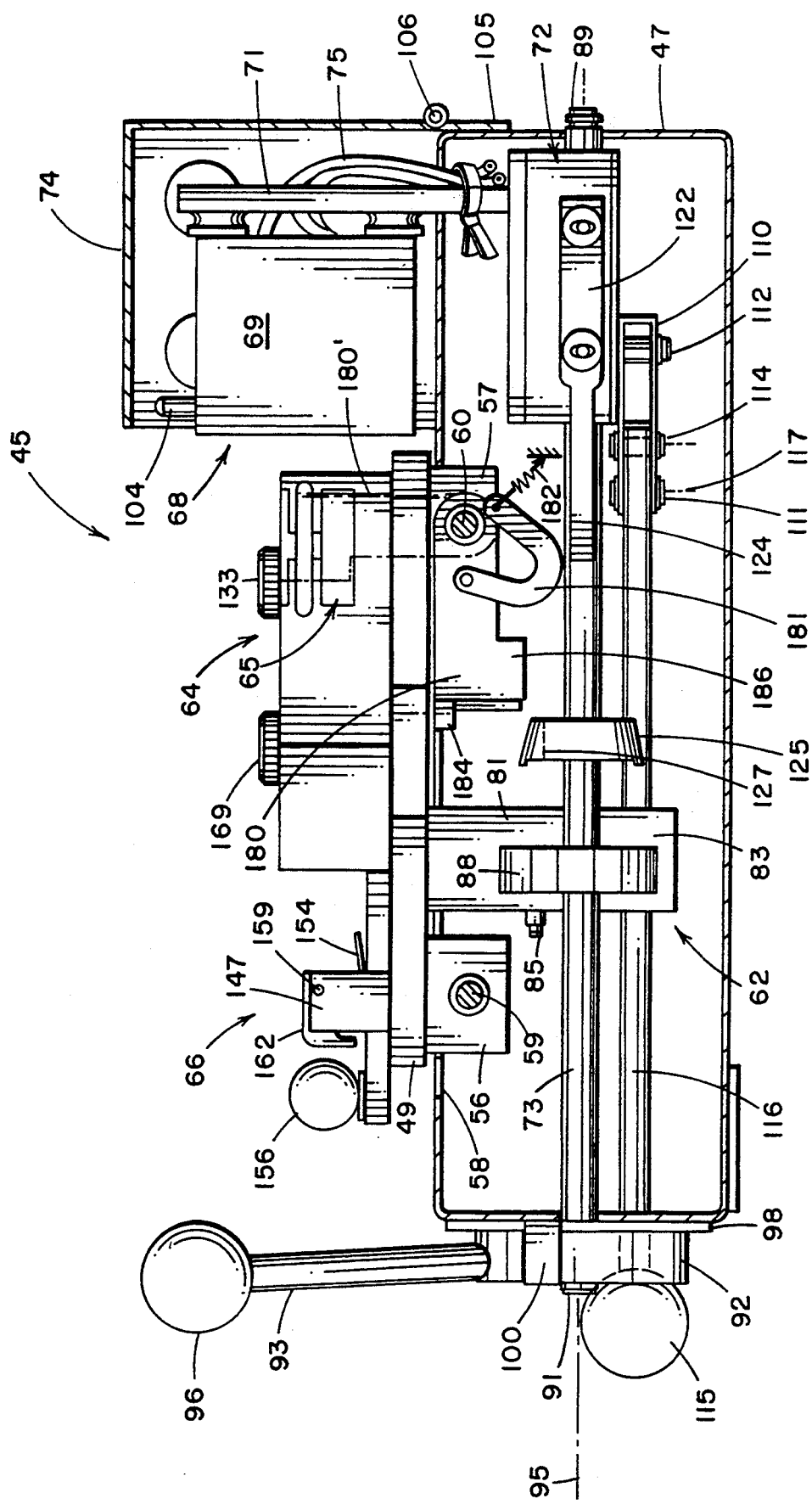
FIG. 4 is a section view taken along the line 4—4 of FIG. 3.

FIGS. 3 and 4 show an embodiment of apparatus 45 suitable for heat welding the bevelled end edges 37, 38 of gasket lengths 21, 36 to form the miter joint 39 at corner 18 shown in FIG. 1. Apparatus 45 includes a housing 46 having an upper horizontal surface 47 above which are positioned left and right generally rectangular, horizontal planar plates 49, 50, which have opposing longitudinally extending parallel edges 52, 53 laterally spaced across a gap 54. The width of gap 54 is made controllable by mounting the plates 49, 50, by means of guide brackets 56, 57 which extend through opening 58 in surface 47, for relative lateral movement along longitudinally-spaced, laterally extending guide rails 59, 60. A cam assembly 62, discussed below, functions to selectively control the spacing of the cars constituted by the plates 49, 50.

Each plate or car 49, 50 carries a complementary jig and clamp set 64, providing a hollow channel 65 for respectively supporting a corresponding one of the gasket lengths 10, 16. A slide assembly 66 associated with each plate 49, 50 serves to separate the corresponding jig and clamp set 64 to enable insertion and removal of the gasket lengths. A heater 68, in the form of a vertically extending rectangular block 69, is mounted by means of an L-shaped support 71 (FIG. 4), through the opening 58 to a carriage 72 located within the hollow interior of housing 46. Carriage 72 is mounted for movement along a longitudinally extending cam shaft 73 journalled for rotation within housing 47. Carriage 72 is configured to normally position heating element 69 within an apertured protective cage 74, at the back of surface 47, away from gap 54 between the spaced jig and clamp sets 64. Heater element 69 is connected via electrical cables 75 in known ways to electrical control circuitry 77, which may include an on-off switch 78, a temperature sensor, and a known temperature control unit, such as an REX-C10 single loop MCU based direct digital controller 79 available from RKC Instrument, Inc.

Figure 5:
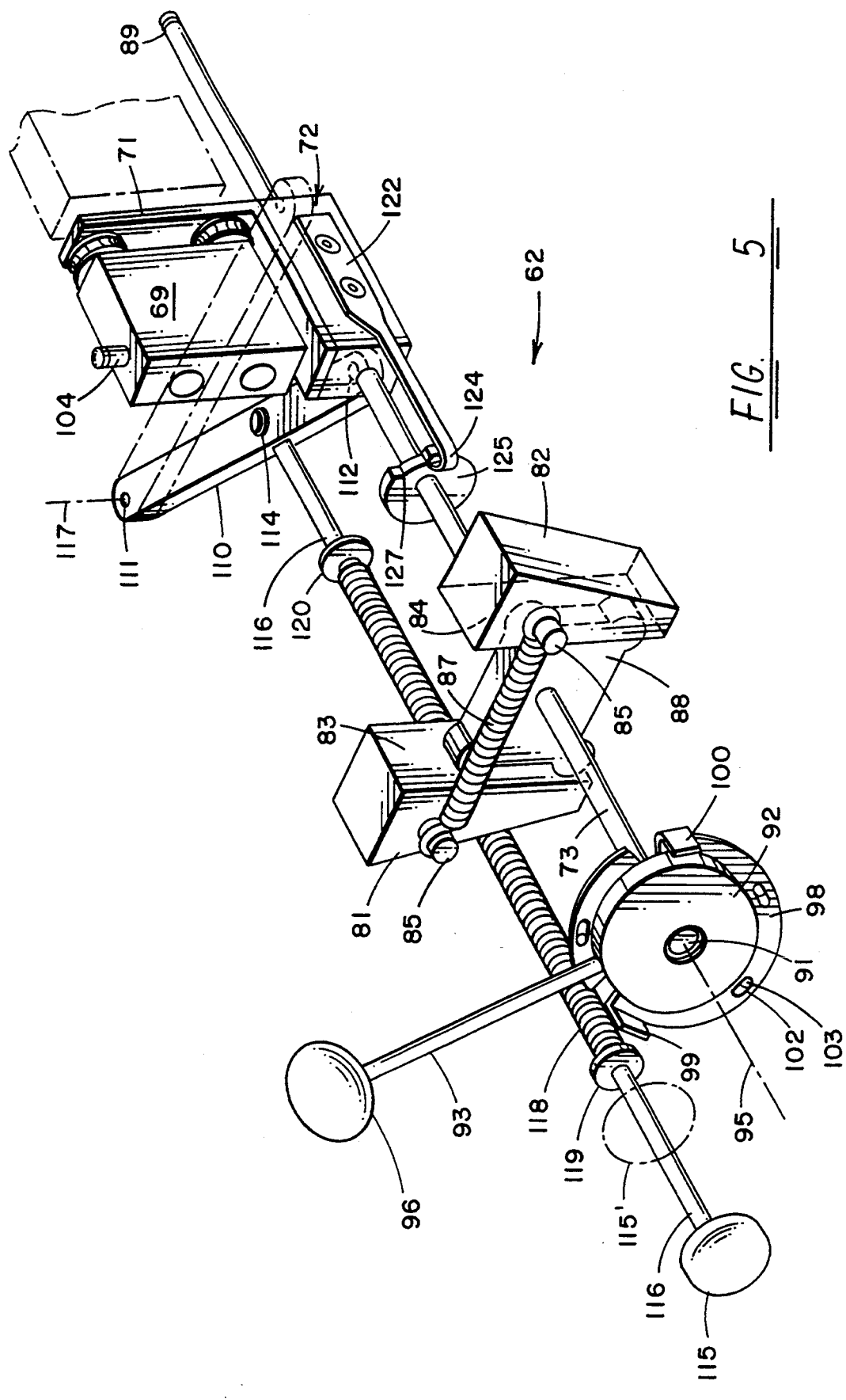
FIG. 5 is a view showing details of the cam and lock assemblies of the apparatus of FIGS. 3 and 4.

Details of the elements of the cam assembly 62 that controls relative movement of the cars 49, 50 are shown in FIGS. 4 and 5. Complementary left and right cam followers 81, 82 are respectively attached to the undersides of plates 49, 50 to depend through the opening 58. The followers 81, 82 may be wedge-shaped, as illustrated, formed to present vertically extending, parallel opposing rectangular faces 83, 84. Each follower 81, 82 includes a longitudinally forwardly projecting pin 85, between which means, such as spring 87, is extended for biasing the faces 83, 84 (and, thus, the plates 49, 50)

toward each other. The faces 83, 84 are, however, held apart by the intermediary of a cam 88 mounted for rotation on cam shaft 73. The back end 89 of shaft 73 is journalled at the back of housing 47. The front 91 of shaft 73 extends through the front of housing 47 and has a terminal end about which a transversely extending handle 93 is mounted. An inner end of the handle is locked to a disk 92 for moving the shaft 73 angularly about an axis 95 (FIGS. 4 and 5) in response to manual arcwise movement of a knob 96 attached to the outer end of handle 93. A circular plate 98, mounted coaxially about shaft 73 on the front surface of the housing 47, includes forwardly projected lobes 99, 100 which limit the extent of arcwise travel of the handle 93. Plate 98 includes enlarged arcuate slots 102, larger than fasteners 103 which extend therethrough into housing 47, to enable angular adjustment of the fixed position of plate 98 relative to the housing, for setting the desired beginning and end limits of travel of the handle 93.

Cam 88 is a planar member, having a generally rectangular shape extending in a lateral plane, and is dimensioned to provide three different spacings for the gap 54 between the respective jig and clamp sets 64. The cam 88 has rounded outward projections at the corners where adjacent long and short sides of the rectangle meet. The different spacings are, accordingly, respectively defined as a longest spacing, an intermediate spacing and a shortest spacing. The longest spacing is the diagonal dimension which exists when opposite, rounded corners are in respective, horizontally aligned abutment with the faces 83, 84; the intermediate spacing is the length dimension which occurs when the short sides are respectively brought parallel with the faces 83, 84; and the shortest spacing is the width dimension when the long sides are brought respectively into parallel relationship with the faces 83, 84. The relationship of the spacings with the welding operation is described below.

Heater block 69 normally occupies a position shielded within the confines of the box-like apertured cage 74. Cage 74 functions to keep hot surfaces confined when block 69 is not actively engaged in the welding process. Block 69 includes an upward projection 104 which can be used for manual spot welding and feathering of the gaskets. Cage 74 is mounted to the back of housing 47 by a hinge attachment plate 105, which enables the cage to be pivoted backward about a pin 106 (FIG. 4) to expose the projection 104. The lower front of cage 74 is provided at the sides with outwardly laterally extending horizontal lugs 107 (FIG. 3). Lugs 107 have apertures through which means, such as threaded fasteners 108, may be passed to engage with housing 47, for releasably locking cage 74 in its block 69 shielding position.

As mentioned above, heater block 69 is mounted via L-shaped support member 71 atop carriage 72 for transportation longitudinally, axially of cam shaft 73. Movement of carriage 72 between the shielded position of FIGS. 3 and 4 and the advanced position of FIG. 5 is controlled by the position of a lever arm 110 (FIGS. 4 and 5). Arm 110 extends horizontally, laterally between a pivotal attachment point 111 fixed in housing 46, and a second pivotal attachment point 112 fixed on the underside of carriage 72. Rod 116, which is journalled for axial movement longitudinally within housing 47, has a free end attached to arm 110 at a third pivotal attachment point 114. The opposite end of rod 116 projects forwardly through the front wall of housing 47 and is capped by a manually grippable knob 115. Pulling knob 115 forward from a normal position 115' (shown in dot-dash lines in FIG. 5) to an advanced position 115 (shown in solid lines in FIG. 5), rotates arm 110 forward through an arc about a vertical axis 117 of pivot point 111, bringing arm 110 (and, thus, heater block 69) from its retracted position (dot-dashed position in FIG. 5) to its advanced position (solid line position in FIG. 5) through the front opening of cage 74, and into gap 54 between the left and right jig and clamp sets 64. A spring 118 (FIG. 5), annularly positioned between a first collar 119 abutting the front wall of housing 47 and a second collar 120 fixed at a rearward axially spaced position along rod 116, serves to bias arm 110 (and, thus, heater block 69) into its retracted position. A spring steel locking finger 122 having a rear end mounted on carriage 72 and a forwardly projecting hooked front end 124, serves to releasably lock the heater block 69 in its advanced position. As carriage 72 moves forward longitudinally, the rounded contour of hooked end 124 drives the end 124 laterally out and over the forwardly outward taper of a lock wheel 125 which is fixed at a predefined position along shaft 73. The hooked end 124 thereafter remains captive about wheel 125 until a segment 127 is rotated into alignment with the end 124. When this occurs, hook end 124 is freed to pass through the cutout, and carriage 72 is driven backward under action of spring 118, until the starting position of block 69 is restored.

Figure 6:
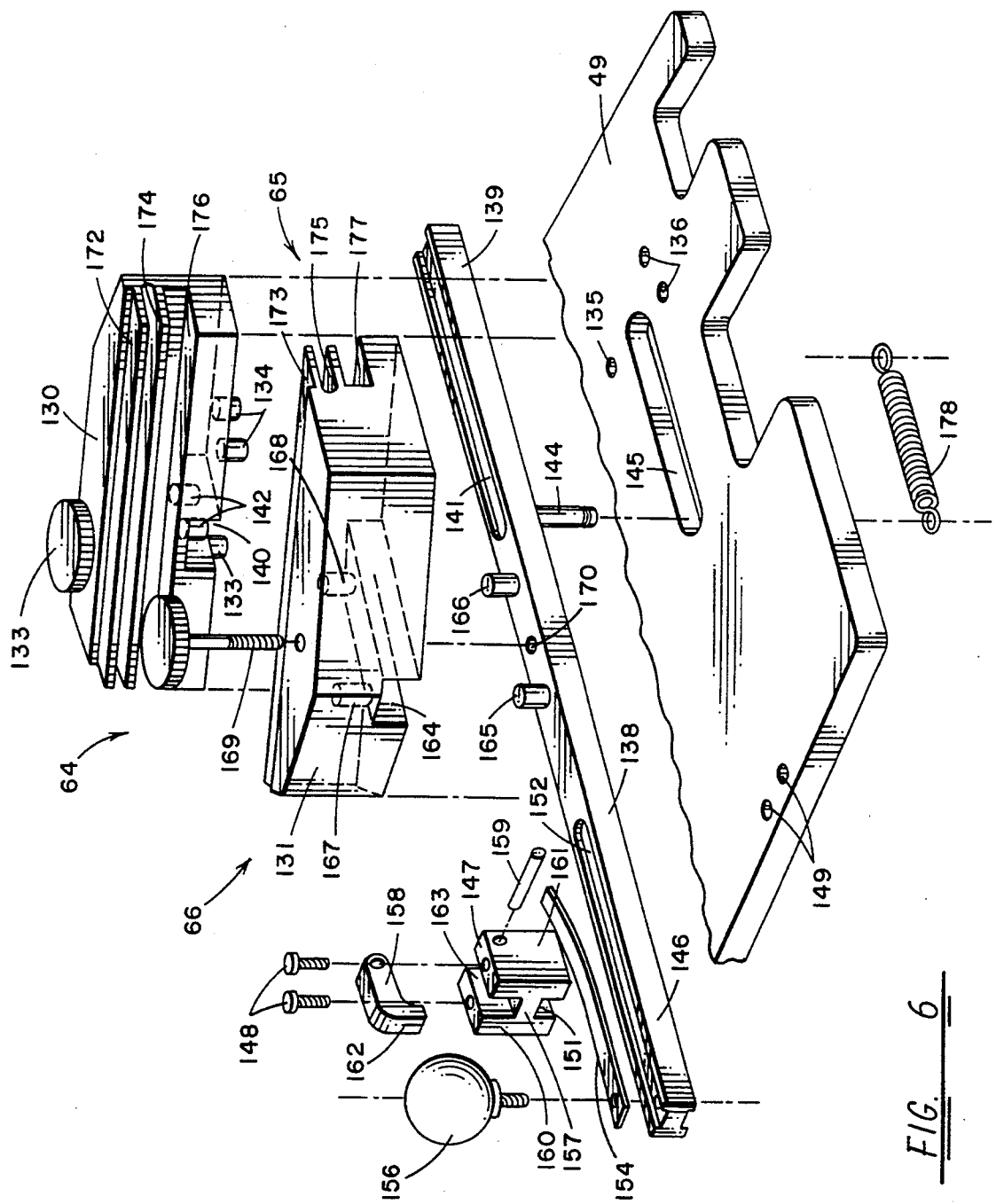
FIG. 6 is an exploded view showing details of the clamp slide assembly of the apparatus of FIGS. 3 and 4.

FIG. 6 illustrates details of the components slide assemblies 66. Each jig and clamp set 65 includes a jig 130 and a complementary clamp 131. Jig 130 is fixed in position atop the upper surface of plate 49 by suitable fastening means, such as threaded fastener 133 and orientation pins 134 which mate with corresponding threaded and unthreaded bores 135, 136 of plate 49. Clamp 131 is likewise mounted atop the upper surface of plate 49; however clamp 131 is made longitudinally movable relative to fixed jig 130. One means of accomplishing this is by means of the sliding rod arrangement shown in FIG. 6. In this arrangement, an elongated slide 138 is longitudinally extended across the top surface of each plate 49, 50. A rear portion 139 is extended through a longitudinal channel 140 formed in the jig 130. The top of portion 139 includes a longitudinal recess 141 into which guide pins 142, which protrude downwardly into channel 140, can be fitted. A pin 144 projects downwardly from the undersurface of rear portion 139 below the leading end of recess 141, and passes through a longitudinal slot 145 formed through the plate 49, 50. The projection of pins 142 into recess 141, and projection of pin 144 through the slot 145, restricts movement of the slide 138 to longitudinal movement within the confines of the permitted extent of travel of the pin 144 within the slot 145.

A guide for a front portion 146 of slide 138 is provided by an H-shaped slide retainer 147 which attaches via fasteners 148 to the front of each plate 49, 50 at points 149. Retainer 147 includes a lower longitudinal channel 151, in coaxial alignment with slot 145 and jig channel 140, through which the portion 146 of slide 138 is received. A longitudinal recess 152 formed on the top surface of slide 138 at the front portion 146 serves to receive a longitudinally extending leaf spring 154, which bends upwardly at its rear end by an angle of approximately 5° relative to the top surface of the rod. This angling functions to lock the slide 138 in a forward, clamp "open" position when slide 138 is pulled forward by manually gripping a knob 156 threaded through the leading end of spring 154 into portion 146. As the slide is drawn through channel 151, the free end of spring 154 yields until it is drawn past the laterally extending crosspiece 157 of the retainer 147. When this point is reached, the end springs upward, catching the crosspiece to prevent retraction of slide 138 backward until the spring is released. Release is accomplished by the medium of a release clamp 158 which is pivotally connected by means of a lateral pin 159 in an upper longitudinal channel 163 located between the top ends of laterally spaced pillars 160, 161 of retainer 147. Clamp 158 includes a downwardly projecting nose 162 at its front which can be depressed against the spring back end, to release the slide 138. Positioning of clamp 131 at its designated location relative to slide 138 and jig 130 is accomplished by means of longitudinal channel 164 extending through the clamp 131. Correct positioning is assured by means of upwardly directed alignment pins 165, 166 on slide 138, which fit into downwardly open blind bores 167, 168 which open onto channel 164. Clamp 131 is locked in position by means of threaded fastener 169 which is passed through clamp 131 into bore 170.

Each jig and clamp set 64 is configured to support a length 21 or 36 of a gasket during the welding operation. The channel 65 (FIGS. 3 and 4) presented when clamp 131 is brought into abutment against jig 130, has a female cross-sectional profile to match the male cross-sectional profile of the gasket extrusion, each element 130, 131 presenting a different side of the profile. For the illustrated profile, each set 64 presents a three tiered channel 65, with each tier corresponding to a different portion of the gasket. The upper tier comprises channels 172, 173 (FIG. 6) which match and support the upper cavity 22 (see FIG. 1). The second tier, comprising channels 174, 175, is configured to match and support the bellows 23. The lowest tier, comprising channels 176, 177, matches and supports the oppositely flanged base portion 24. The respective jig and clamp sets 64 are positioned on the cars 49, 50 so that a gasket length 21 positioned coaxially within the left channel 65 will be at right angles to a gasket length 36 positioned within the right channel 65. A spring 178 located below slot 145 extends between the base of pin 144 and housing 47 to bias slide 138 into its rearmost position.

Figure 7A:
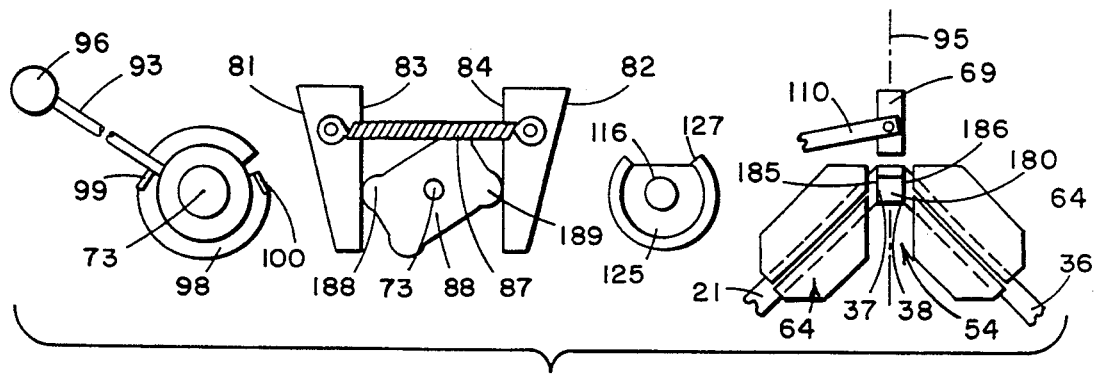
FIGS. 7A–7D are schematic views showing successive steps in the method of the invention using the apparatus of FIGS. 3–6.

For purposes of determining the extent to which gasket lengths 21, 36 should be brought into the gap 54 during the welding process, a gauge element in the form of a sissy bar 180 is pivotally mounted on the rear rail 60 (see FIG. 4) between the guide brackets 57 of the respective plates 49, 50. An arcuate link 181 has one end pivotally attached to the middle of the bar 180 and another end connected via a spring 182 (shown schematically in FIG. 4) to housing 47. Spring 182 serves to bias bar 180 into its retracted "down" position (shown in solid lines in FIG. 4), clear of the travel paths of heater block 69 and carriage 72. The front or top end of bar 180 includes a reduced semi-circular portion 184 which serves as a finger hold for rotating bar 180 about rail 60 into its raised "up" position 180' (shown in dot-dashed lines in FIG. 4). Thus lifted, the bar 180 presents opposite surfaces 185, 186 (see FIG. 7A) against which the bevelled edges of gasket lengths 21, 36 can be abutted. When not in use, bar 180 is returned to its "down" position out of the way movement of the block 69 and carriage 72.

The welding method of the invention can be accomplished using the described apparatus. Lengths 21, 36 of gasket material are cut at opposite 45° angles to provide bevelled ends 37, 38 which are to be joined by heat welding to present a miter joint 39. This can be accomplished, for example, using an adjustable gasket cutter, such as described in U.S. Pat. No. 2,493,513. The cam handle 93 is then brought into its most counterclockwise position, i.e., its position against left lobe 99 on plate 98. This is shown by the leftmost view in FIG. 7A. With the handle in this position, shaft 73 is angularly oriented so cam 88 is brought against the bias of spring 87 into its longest spacing position, with diagonally opposite corners 188, 189 in respective horizontal alignment, abutting faces 83, 84 of cam followers 81, 82. This places lock wheel 125 so that its cutout 127 is oriented as shown in the third view from the left in FIG. 7A, and spaces the left and right jig and clamp sets 64, as shown in the rightmost view. Heater block 69 remains in its normal rearward retracted position, shielded by cage 74. Sissy bar 180 may then be raised up into gap 54 as indicated, to provide a gauge against which edges 37, 38 may be brought.

If not already done, the on-off switch 78 is then placed in its "on" position, and control 79 operated to heat block 69 to the desired welding temperature. The bar 180 is then dropped and knob 115 is pulled forward to the solid line position of FIG. 5, pivoting arm 110 about axis 117 of housing pivot point 111, and shifting block 69 forward into gap 54 between the bar position ends 37, 38. The relative dimensioning of bar 180 and block 69 ensures that no contact yet occurs between the gasket ends 37, 38 and the heated block 69.

Figure 7B:
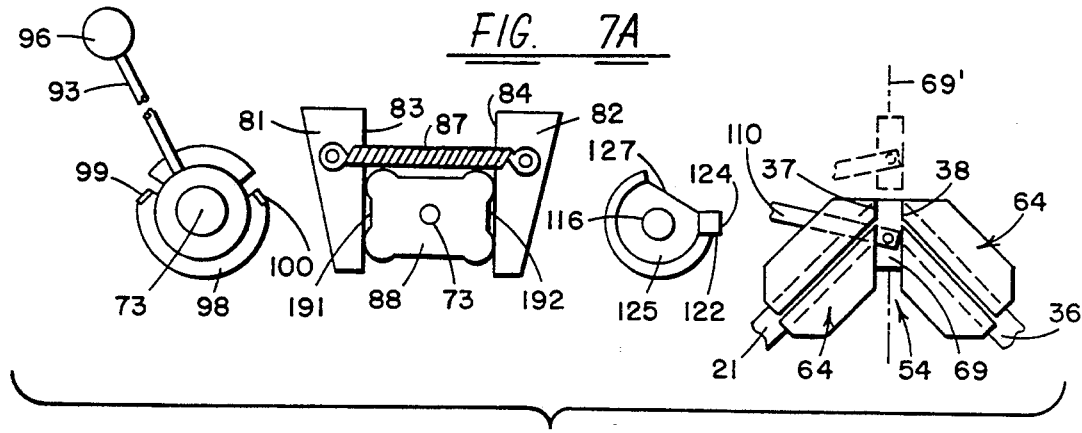

Arm 93 is then rotated clockwise into its second position, as shown in the leftmost view of FIG. 7B. This rotates cam 88 into its intermediate spacing position between faces 83, 84 against the bias of spring 87, to where the short sides 191, 192 are respectively brought parallel with the faces 83, 84. Bringing handle 115 forward brings the hooked end 124 of finger 122 over the front edge of lock wheel 125, capturing it while moving cutout 127 into the angular position shown in FIG. 7B. The rotation of cam 88 from its longest to its intermediate spacing position moves the jig and clamp sets 64 closer together, so that the bevelled edges of ends 37, 38 are brought into contact with the heating element 69.

Figure 7C:
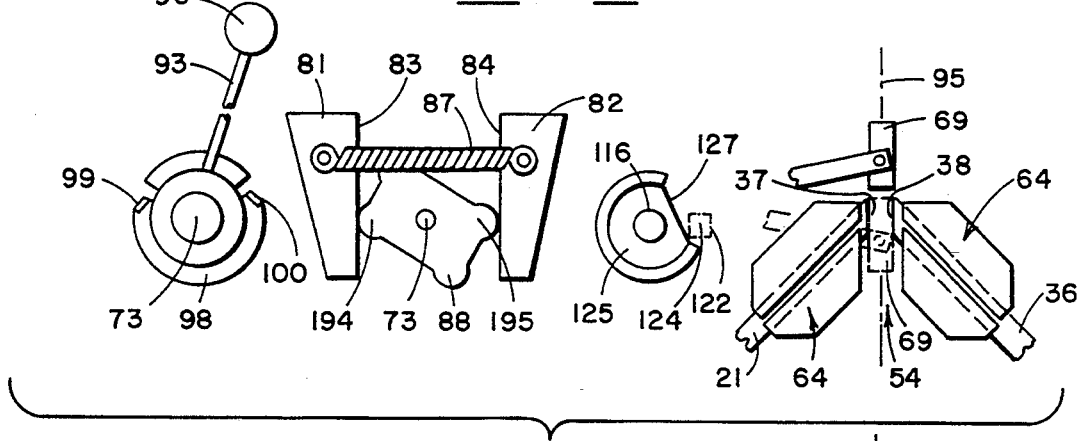
Figure 7D:
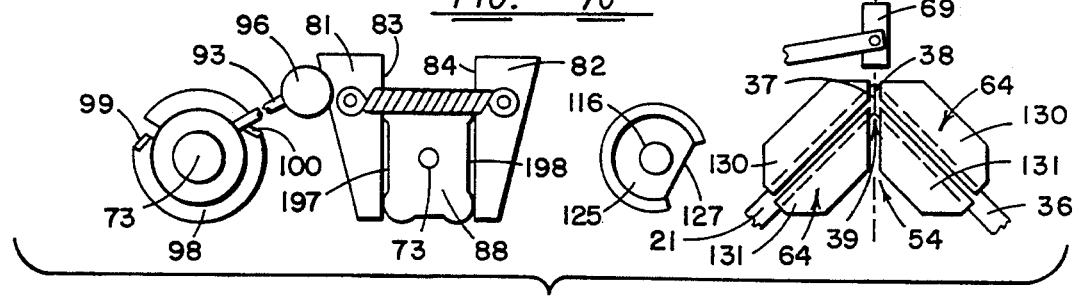

The gap 54 spacing shown in the rightmost view of FIG. 7B is maintained just long enough to liquify or melt the ends 37, 38 by the desired amount, e.g., a count of four. The handle 93 is then rotated through the third position shown by the leftmost view in FIG. 7C, toward the fourth most clockwise position shown by the leftmost view in FIG. 7D. The momentary passage through the third position rotates cam 88 through its intermediate spacing position once more. This time, the intermediate spacing is determined by the diagonal dimension which exists when opposite, rounded corners 194, 195 are brought into respective abutment with the faces 83, 84 of the cam followers 81, 82. The significance of this is that the respective sets 64 (see rightmost view in FIG. 7C) are separated, momentarily carrying the molten ends 37, 38 away from the heated block 69, just as the cutout 127 of the lock wheel 125 is rotated to a position of alignment with the hooked end 124 of the spring finger 122. This causes the block 69 to spring back to its retracted position under the biasing action of spring 118, in correspondence with the momentary separation of the molten ends 37, 38. Immediately thereupon, however, the handle 93 is shifted into its last position against lobe 100, bringing cam 88 into its shortest spacing orientation, with the long sides 197, 198 brought into parallel relationship with the faces 83, 84. Lock wheel 125, which no longer holds the hooked end 124 of finger 122, moves into the position shown, and the respective left and right sets 64 move into close proximity, narrowing gap 54 to its closest spacing, and bringing the molten ends 37, 38 into their solidifying joining positions, forming the miter joint 39 when cured. The respective slides 138 can then be pulled forward to separate the clamps 131 from the jigs 130, and enable removal of the corner joined gasket lengths.

It will be appreciated that though the method of the invention employing the apparatus 45 of the invention has been described with reference to heat welding elastomeric strips 21, 36 having Applicant's novel universal profile, the benefits of the apparatus and method of the invention may be realized when applied to heat weldable material strips of other profiles as well. The described configuration provides for ready removability of both jig and clamp members 130, 131, and replacement thereof with other members having other channel configurations for providing support to corresponding other profile cross-sections.

Those skilled in the art to which the invention relates will appreciate that other substitutions and modifications can be made to the described embodiment without departing from the spirit and scope of the invention as described by the claims below.

What is claimed is:

1. Apparatus for heat welding end edges of heat fusible gasket material together to form a joint, said apparatus comprising:
   a housing;
   left and right plates spaced across a gap;
   means mounting said plates on said housing for relative movement of said plates with respect to each other;
   left and right members mounted on said housing for travel with said plates, said members including channels for respectively supporting corresponding left and right lengths of said gasket material with said end edges disposed in spaced, facing positions within said gap;
   a heater element including heated surfaces;
   means mounting said heater element on said housing for selective movement between a retracted position removed from said gap and an advanced position with said heated surfaces within said gap facing said end edges disposed in said spaced, facing positions;
   means biasing said heater element into said retracted position;
   means for releasably locking said heater element in said advanced position;
   means, cooperative with said plate mounting means, for selectively setting the spacing of said gap to longest, intermediate and shortest spacing positions; and
   means cooperative with said selectively setting means and said locking means for setting said spacing to said longest spacing position and for releasing said heater element from said advanced to said retracted position under action of said biasing means, automatically in response to changing the setting of said plates from said intermediate spacing position, through said longest spacing position, to said shortest spacing position;
   wherein said selectively setting means comprises a shaft mounted on said housing for selective rotation, a cam mounted on said shaft, and cam followers respectively fixed on said plates and positioned to track said cam.

2. Apparatus as in claim 1, for heat welding end edges of gasket material having a gasket profile, wherein said left and right members comprise left and right complementary jig and clamp sets, and said channels are defined by gasket profile matching cavities.

3. Apparatus as in claim 2, further comprising a slide assembly associated with each plate for selectively separating each clamp from its associated jig.

4. Apparatus as in claim 1, wherein said channels are dimensioned and configured for supporting said left and right lengths of said gasket material at right angles to each other.

5. Apparatus as in claim 1, wherein said means mounting said heater element comprises a carriage mounted for axial movement along said shaft.

6. Apparatus as in claim 5, wherein said means mounting said heater element further comprises a lever arm having opposite ends, said lever arm being pivotally mounted at one of said ends to said housing and at the other of said ends to said carriage; and a rod attached to said lever arm for moving said arm to shift said carriage for moving said heater element between said retracted to said advanced positions.

7. Apparatus as in claim 6, further comprising a lockwheel having an edge; and wherein said locking means comprises a spring finger having an end fixed to said carriage and another hook shaped free end that has a rounded leading edge dimensioned and configured to pass over said lockwheel edge when said carriage moves said heater element to said advanced position.

8. Apparatus as in claim 7, wherein means for releasing said heater element comprises said lockwheel being mounted for rotation with said shaft; said lockwheel including a cutout; and said cutout being dimensioned, configured and positioned so that said cutout aligns with said hooked end to release said finger as said cam passes through said longest spacing position, in travel from its intermediate spacing position to its shortest spacing position.

9. Apparatus for heat welding end edges of heat fusible gasket material together to form a joint, said apparatus comprising:.
   a housing;
   left and right plates spaced across a gap;
   means mounting said plates on said housing for relative movement of said plates with respect to each other;
   left and right members mounted on said housing for travel with said plates, said members including channels for respectively supporting corresponding left and right lengths of said gasket material with said end edges disposed in spaced, facing positions within said gap;
   a heater element including heated surfaces;
   means mounting said heater element on said housing for selective movement between a retracted position removed from said gap and an advanced position with said heated surfaces within said gap facing said end edges disposed in said spaced, facing positions;

means biasing said heater element into said retracted position;

means for releasably locking said heater element in said advanced position;

means, cooperative with said plate mounting means, for selectively setting the spacing of said gap to longest, intermediate and shortest spacing positions;

means cooperative with said selectively setting means and said locking means for setting said spacing to said longest spacing position and for releasing said heater element from said advanced to said retracted position under action of said biasing means, automatically in response to changing the setting of said plates from said intermediate spacing position, through said longest spacing position, to said shortest spacing position;

a guide rail; and a sissy bar having oppositely facing gasket alignment surfaces and being mounted on said guide rail for selective pivotal movement between an "up" position wherein the gasket ends can be brought against the respective alignment surfaces, and an out-of-the-way "down" position.

* * * * *